(12) United States Patent
Lee et al.

(10) Patent No.: US 12,097,746 B2
(45) Date of Patent: Sep. 24, 2024

(54) HEAT EXCHANGER AND REFRIGERANT MODULE OF INTEGRATED THERMAL MANAGEMENT SYSTEM FOR VEHICLE INCLUDING SAME

(71) Applicants: Hyundai Motor Company, Seoul (KR); Kia Corporation, Seoul (KR); Hyundai WIA Corporation, Changwon-si (KR)

(72) Inventors: Sang Shin Lee, Suwon-si (KR); Ki Mok Kim, Busan (KR); Man Ju Oh, Yongin-si (KR); Man Hee Kim, Seoul (KR); Se Min Lee, Uiwang-si (KR); Bong Jun Park, Uiwang-si (KR)

(73) Assignees: Hyundai Motor Company, Seoul (KR); Kia Corporation, Seoul (KR); Hyundai WIA Corporation, Changwon-si (KR)

( * ) Notice: Subject to any disclaimer, the term of this patent is extended or adjusted under 35 U.S.C. 154(b) by 56 days.

(21) Appl. No.: 17/969,861

(22) Filed: Oct. 20, 2022

(65) Prior Publication Data
US 2023/0182526 A1    Jun. 15, 2023

(30) Foreign Application Priority Data
Dec. 15, 2021 (KR) .......... 10-2021-0179803

(51) Int. Cl.
*B60H 1/00* (2006.01)
*B60H 1/32* (2006.01)

(52) U.S. Cl.
CPC ..... *B60H 1/00342* (2013.01); *B60H 1/32284* (2019.05); *B60H 2001/3291* (2013.01)

(58) Field of Classification Search
CPC ........... B60H 1/00342; B60H 1/32284; B60H 2001/3201; F25B 2400/05; F25B 2400/051; F25B 2400/054
USPC ..................................... 62/113, 513
See application file for complete search history.

(56) References Cited

U.S. PATENT DOCUMENTS

| | | | |
|---|---|---|---|
| 1,438,178 A | 12/1922 | Heideman et al. | |
| 5,245,836 A * | 9/1993 | Lorentzen | F25B 40/00 62/503 |
| 6,105,386 A * | 8/2000 | Kuroda | F25B 40/00 62/113 |
| 6,167,713 B1 | 1/2001 | Hartfield et al. | |
| 6,178,761 B1 * | 1/2001 | Karl | F25B 9/008 62/197 |

(Continued)

OTHER PUBLICATIONS

United States Patent and Trademark Office, Office Action received in related U.S. Appl. No. 17/972,287, filed Oct. 12, 2023, 9 pages.

(Continued)

*Primary Examiner* — Marc E Norman
(74) *Attorney, Agent, or Firm* — Slater Matsil, LLP

(57) ABSTRACT

An embodiment heat exchanger includes a first flow path through which a refrigerant discharged from a condenser and drawn into an expansion valve flows and a second flow path through which the refrigerant discharged from a vapor-liquid separator and drawn into a compressor flows, wherein the heat exchanger is configured to perform a heat exchange between the refrigerant flowing through the first flow path and the refrigerant flowing through the second flow path.

18 Claims, 7 Drawing Sheets

(56) References Cited

U.S. PATENT DOCUMENTS

| | | | |
|---|---|---|---|
| 6,523,360 B2 * | 2/2003 | Watanabe | F25B 9/008 |
| | | | 62/204 |
| 6,584,796 B2 * | 7/2003 | Itoh | F25B 40/00 |
| | | | 62/159 |
| 6,640,559 B1 | 11/2003 | McQuade | |
| 6,857,280 B1 * | 2/2005 | Yamanaka | B60H 1/00978 |
| | | | 62/205 |
| 2004/0237577 A1 | 12/2004 | Nishida et al. | |
| 2005/0262873 A1 * | 12/2005 | Hirota | F25B 43/006 |
| | | | 62/503 |
| 2006/0137385 A1 * | 6/2006 | Take | F28D 1/05366 |
| | | | 62/513 |
| 2006/0185825 A1 | 8/2006 | Chen et al. | |
| 2007/0125106 A1 * | 6/2007 | Ishikawa | F25B 9/008 |
| | | | 62/186 |
| 2007/0227165 A1 * | 10/2007 | Ohta | F25B 41/335 |
| | | | 62/196.1 |
| 2008/0060365 A1 * | 3/2008 | Sakitani | F25B 13/00 |
| | | | 62/227 |
| 2009/0260386 A1 * | 10/2009 | Wittmann | B60H 1/323 |
| | | | 62/324.2 |
| 2010/0155017 A1 * | 6/2010 | Lemee | F25B 41/00 |
| | | | 165/53 |
| 2012/0216562 A1 | 8/2012 | Kadle et al. | |
| 2019/0039440 A1 | 2/2019 | Calderone | |
| 2020/0086711 A1 | 3/2020 | Kim et al. | |
| 2022/0402328 A1 | 12/2022 | Kim et al. | |
| 2023/0143363 A1 | 5/2023 | Oh et al. | |

OTHER PUBLICATIONS

United States Patent and Trademark Office, Office Action received in related U.S. Appl. No. 17/972,323, filed Oct. 26, 2023, 10 pages.

* cited by examiner

HEAT EXCHANGER AND REFRIGERANT MODULE OF INTEGRATED THERMAL MANAGEMENT SYSTEM FOR VEHICLE INCLUDING SAME

CROSS-REFERENCE TO RELATED APPLICATIONS

The present application claims the benefit of Korean Patent Application No. 10-2021-0179803, filed on Dec. 15, 2021, which application is hereby incorporated herein by reference.

TECHNICAL FIELD

The present invention relates generally to a heat exchanger and a refrigerant module of an integrated thermal management system for a vehicle including the same.

BACKGROUND

Recently, due to environmental issues of internal combustion engine (ICE) vehicles, the distribution of environmentally friendly vehicles, such as electric vehicles, is increasing. However, an ICE vehicle of the related art can heat the cabin using waste heat of the engine and thus does not need heating energy. In contrast, an environmentally friendly vehicle, such as an electric vehicle, does not have a heat source, such as an engine, and thus heats the cabin using a separate energy source, thereby disadvantageously reducing the fuel efficiency.

In addition, the issue of, for example, reduced fuel efficiency of an electric vehicle is a reason for reducing the driving distance. Thus, there is a problem in that the vehicle is required to be charged frequently.

In this regard, an air conditioning system of an environmentally friendly vehicle, such as an electric vehicle, uses a heat pump system having a different mechanism from that of an air conditioning system of an ICE vehicle.

In general, the heat pump system is a cooling/heating system configured to transfer heat from a low-temperature heat source to a high-temperature object using the generation of heat or condensation heat of a refrigerant or from a high-temperature heat source to a low-temperature object. The heat pump system absorbs heat from the outside and discharges the absorbed heat to the inside during heating, and discharges heat to the outside during cooling.

However, in the environmentally friendly vehicle, such as an electric vehicle, thermal management for electric components, such as a battery and a motor, in addition to the air conditioning system must be added.

That is, the cabin space, the battery, and electric devices used in the environmentally friendly vehicle, such as an electric vehicle, have different needs for air conditioning. A technology able to save as much energy as possible by independently coping with needs while enabling the components to efficiently work in concert is required. Accordingly, a concept of integrated thermal management of a vehicle is proposed in order to independently perform thermal management for respective components and integrate overall thermal management, thereby improving thermal efficiency.

In order to perform integrated thermal management of a vehicle, it is necessary to integrate and modularize complicated components including cooling water lines, refrigerant lines, and other components. A concept of modularization able to modularize a plurality of components and simplify fabrication while being compact in terms of packaging is required.

In the meantime, recently, research for improving the efficiency of the heat pump in the electric vehicle is actively underway.

As an example of solutions for improving the efficiency of the heat pump is a gas injection-type heat pump.

The gas injection-type heat pump is a solution for improving the heating efficiency of a vehicle by increasing the flow rate of a refrigerant circulating during heating by using a heat exchanger (H/X) or a flash tank.

The embodiments of the present invention recognize that the applicability of energy consumed in a compressor may be increased by refrigerant-to-refrigerant heat exchange as long as a point at which heat exchange between a flow of refrigerant condensed in a condenser and a flow of refrigerant expanded during passing through an expansion valve can be ensured when refrigerant-related components are modularized into a compact design.

The foregoing is intended merely to aid in the understanding of the background of the present invention, and is not intended to mean that the present invention falls within the purview of the related art that is already known to those skilled in the art.

SUMMARY

The present invention relates generally to a heat exchanger and a refrigerant module of an integrated thermal management system for a vehicle including the same. Particular embodiments relate to a heat exchanger able to provide a compact design of refrigerant-related components by modularizing the refrigerant-related components and able to improve the applicability of energy by heat exchange between flows of refrigerant and a refrigerant module of an integrated thermal management system for a vehicle.

Accordingly, embodiments of the present invention keep in mind problems occurring in the related art, and embodiments of the present invention provide a heat exchanger able to provide a compact design of refrigerant-related components by modularizing the refrigerant-related components and improve the applicability of energy by heat exchange between flows of refrigerant and a refrigerant module of an integrated thermal management system for a vehicle.

Embodiments of the present invention are not limited to the aforementioned description, and other embodiments not explicitly disclosed herein will be clearly understood by a person having ordinary skill in the art from the description provided hereinafter.

According to one embodiment of the present invention, there is provided a heat exchanger used in a refrigerant module configured such that a refrigerant circulates through a compressor, a condenser, an expansion valve, an evaporator, and a vapor-liquid separator, the heat exchanger including a first flow path through which the refrigerant discharged from the condenser and drawn into the expansion valve flows, and a second flow path through which the refrigerant discharged from the vapor-liquid separator and drawn into the compressor flows. Heat exchange may be performed between the refrigerant flowing through the first flow path and the refrigerant flowing through the second flow path.

A heat exchange region may be provided between the first flow path and the second flow path to directly face the first flow path and the second flow path. The heat exchange between the refrigerant flowing through the first flow path and the refrigerant flowing through the second flow path may be performed on the heat exchange region.

The heat exchange region may include one or more protruding fins protruding in directions of the first flow path and the second flow path.

Each of the protruding fins may have a cross-section constant in a direction in which the refrigerant flows.

The protruding fins on either side of the heat exchange region may be spaced apart from each other in a top-bottom direction.

A first inlet through which the refrigerant is introduced to the first flow path and a first outlet through which the refrigerant is discharged from the first flow path may be open upward. A second inlet through which the refrigerant is introduced to the second flow path and a second outlet through which the refrigerant is discharged from the second flow path may be open downward.

Also provided is a refrigerant module of an integrated thermal management system for a vehicle. The refrigerant module evaporator may be configured such that a refrigerant circulates through a compressor, a condenser, an expansion valve, an evaporator, and a vapor-liquid separator. The refrigerant module evaporator may include the compressor including a first refrigerant intake port through which the refrigerant is drawn and a first refrigerant discharge port through which the compressed refrigerant is discharged, the condenser including a second refrigerant intake port through which the refrigerant discharged from the compressor is drawn and a second refrigerant discharge port through which the heat-exchanged refrigerant is discharged, the expansion valve including a third refrigerant intake port through which the refrigerant discharged from the condenser is drawn and a third refrigerant discharge port through which the expanded refrigerant is discharged, the evaporator including a fourth refrigerant intake port through which the refrigerant discharged from the expansion valve and a fourth refrigerant discharge port through which the heat-exchanged refrigerant is discharged, the vapor-liquid separator including a fifth refrigerant intake port through which the refrigerant discharged from the evaporator is drawn and a fifth refrigerant discharge port through which a liquid refrigerant and a vapor refrigerant separated from the refrigerant are discharged, and the heat exchanger in which heat exchange is performed between the refrigerant discharged from the condenser and drawn into the expansion valve and the refrigerant discharged from the vapor-liquid separator and drawn into the compressor.

The first refrigerant discharge port of the compressor and the second refrigerant intake port of the condenser may be directly connected. The second refrigerant discharge port of the condenser and the third refrigerant intake port of the expansion valve may be indirectly connected through the heat exchanger. The third refrigerant discharge port of the expansion valve and the fourth refrigerant intake port of the evaporator may be directly connected. The fourth refrigerant discharge port of the evaporator and the fifth refrigerant intake port of the vapor-liquid separator may be directly connected. The fifth refrigerant discharge port of the vapor-liquid separator and the first refrigerant intake port of the compressor may be indirectly connected through the heat exchanger.

The heat exchanger may include a first flow path through which the refrigerant discharged from the condenser and drawn into the expansion valve flows and a second flow path through which the refrigerant discharged from the vapor-liquid separator and drawn into the compressor flows. The first flow path and the second flow path may be formed on both sides of a heat exchange region such that the heat exchange between the refrigerant flowing through the first flow path and the refrigerant flowing through the second flow path is performed in the heat exchange region.

The heat exchanger may include a first inlet through which the refrigerant is introduced to the first flow path and a first outlet through which the refrigerant is discharged from the first flow path, the first inlet and first outlet being open upward. The second refrigerant discharge port may be formed downward in a bottom end of the condenser. The third refrigerant intake port may be formed downward in a bottom end of the expansion valve. The first inlet of the heat exchanger may be disposed directly below the second refrigerant discharge port provided in the condenser such that the second refrigerant discharge port and the first inlet are directly connected to and communicate with each other. The third refrigerant intake port of the expansion valve may be disposed directly above the first outlet provided in the heat exchanger such that the first outlet and the third refrigerant intake port are directly connected to and communicate with each other.

The heat exchanger may include a second inlet through which the refrigerant is introduced to the second flow path and a second outlet through which the refrigerant is discharged from the second flow path, the second inlet and the second outlet being open downward. The fifth refrigerant discharge port may be formed upward in a top portion of the vapor-liquid separator. The first refrigerant intake port may be formed upward in a top portion of the compressor. The second inlet of the heat exchanger may be disposed directly above the fifth refrigerant discharge port provided in the vapor-liquid separator such that the fifth refrigerant discharge port and the second inlet are directly connected to and communicate with each other. The first refrigerant intake port of the compressor may be disposed directly below the second outlet provided in the heat exchanger such that the second outlet and the first refrigerant intake port are directly connected to and communicate with each other.

The first flow path and the second flow path formed in the heat exchanger may be in direct contact with the heat exchange region.

The heat exchange region of the heat exchanger may include one or more protruding fins protruding in directions of the first flow path and the second flow path.

Each of the protruding fins may have a cross-section constant in a direction in which the refrigerant flows.

The heat exchanger may include a first inlet through which the refrigerant is introduced to the first flow path, a first outlet through which the refrigerant is discharged from the first flow path, the first inlet and the first outlet being open upward, a second inlet through which the refrigerant is introduced to the second flow path, and a second outlet through which the refrigerant is discharged from the second flow path, the second inlet and the second outlet being open downward. The heat exchanger may include a first body and a second body in which each of the first flow path and the second flow path is halved in flowing directions of the refrigerant. The first inlet and the second outlet may be formed in one side of the first body, and a first flange connected to the second body may be formed on the other side of the first body. A second flange coupled to the first flange of the first body may be formed on one side of the second body, and the second outlet and the first inlet may be formed in the other side of the second body.

The first refrigerant discharge port may be formed upward in a top portion of the compressor. The second refrigerant intake port may be formed downward in a bottom portion of the condenser. The second refrigerant intake port of the condenser may be disposed directly above the first refrigerant discharge port provided in the compressor such that the first refrigerant discharge port and the second refrigerant intake port are directly connected to and communicate with each other.

The third refrigerant discharge port may be formed upward in a top portion of the expansion valve. The fourth refrigerant intake port may be formed downward in a bottom portion of the evaporator. The fourth refrigerant intake port may be disposed directly above the third refrigerant discharge port provided in the expansion valve such that the third refrigerant discharge port and the fourth refrigerant intake port are directly connected to and communicate with each other.

The fourth refrigerant discharge port may be formed downward in a bottom portion of the evaporator. The fifth refrigerant intake port may be formed upward in a top portion of the vapor-liquid separator. The fifth refrigerant intake port of the vapor-liquid separator may be disposed directly below the fourth refrigerant discharge port provided in the evaporator such that the fourth refrigerant discharge port and the fifth refrigerant intake port are directly connected to and communicate with each other.

The compressor and the vapor-liquid separator may be arranged in parallel in a horizontal direction. The condenser and the evaporator may be provided above the compressor and the vapor-liquid separator and may be arranged in parallel in a horizontal direction.

The condenser may include a first cooling water intake port through which cooling water for exchanging heat with the refrigerant drawn through the second refrigerant intake port and discharged through the second refrigerant discharge port is introduced and a first cooling water discharge port through which the cooling water is discharged. The evaporator may include a second cooling water intake port through which cooling water for exchanging heat with the refrigerant drawn through the fourth refrigerant intake port and discharged through the fourth refrigerant discharge port is introduced and a second cooling water discharge port through which the cooling water is discharged.

According to embodiments of the present invention, it is possible to provide a compact design of refrigerant-related components and lines by integrating and modularizing complicated refrigerant-related components and lines.

In addition, according to embodiments of the present invention, paths through which a refrigerant circulates can be minimized, and thus it is possible to expect an effect of improving heat exchange efficiency between the refrigerant and cooling water while reducing the amount of the circulating refrigerant.

Furthermore, the heat exchange between a flow of refrigerant condensed by the condenser and a flow of refrigerant expanded through the expansion valve can be performed using the heat exchanger by which a heat exchanger-type gas injection heat pump system can be realized. Accordingly, the applicability of energy consumed in the compressor can be increased by refrigerant-to-refrigerant heat exchange.

BRIEF DESCRIPTION OF THE DRAWINGS

The above and other objectives, features, and other advantages of embodiments of the present invention will be more clearly understood from the following detailed description when taken in conjunction with the accompanying drawings, in which.

DETAILED DESCRIPTION OF ILLUSTRATIVE EMBODIMENTS

Figure 1:
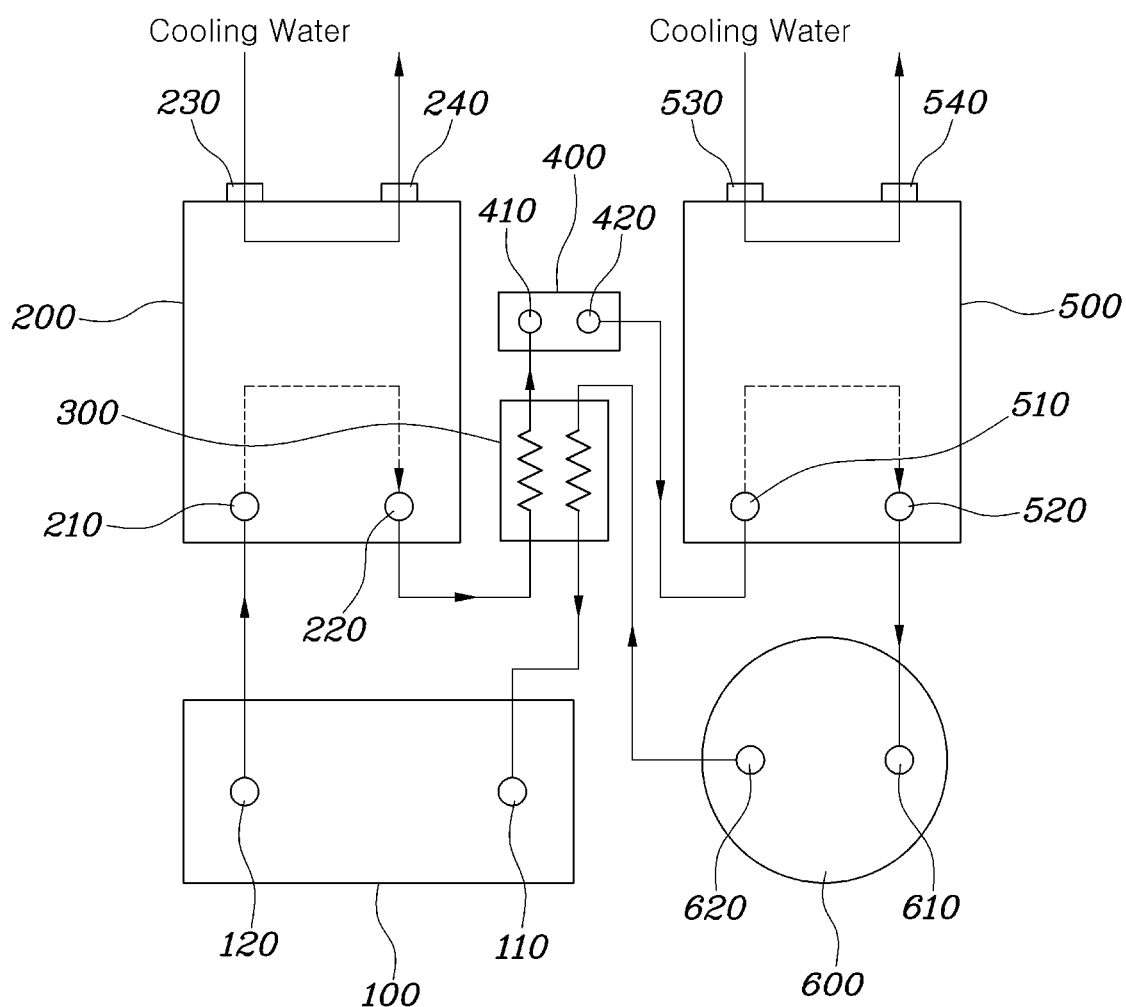
FIG. 1 is a configuration diagram illustrating components of a refrigerant module of an integrated thermal management system for a vehicle according to embodiments of the present invention.

Hereinafter, embodiments of the present invention will be described in more detail with reference to the accompanying drawings. However, the present invention may be embodied in a variety of different forms and should not be construed to be limited to embodiments set forth herein. Rather, these embodiments are provided so that the present disclosure will be thorough and complete, and will fully convey the scope of the invention to a person having ordinary skill in the art. Throughout the drawings, the same or similar elements are denoted by the same reference numerals.

FIG. 1 is a configuration diagram illustrating components of a refrigerant module of an integrated thermal management system for a vehicle according to embodiments of the present invention.

As illustrated in FIG. 1, a refrigerant module of an integrated thermal management system for a vehicle according to embodiments of the present invention is configured such that a refrigerant circulates sequentially through a compressor 100, a condenser 200, an expansion valve 400, an evaporator 500, and a vapor-liquid separator 600. Also provided is a heat exchanger 300 performing heat exchange between the refrigerant discharged from the condenser and the refrigerant discharged from the vapor-liquid separator 600.

More specifically, after the refrigerant is compressed in the compressor 100, the refrigerant flows to the condenser 200 and is condensed through heat exchange with cooling water. The refrigerant condensed in this manner passes through the heat exchanger 300 and then flows to the expansion valve 400 so as to expand therein. In addition, the refrigerant expanded in the expansion valve 400 flows to the evaporator 500 to evaporate through heat exchange with the cooling water and then is introduced to the vapor-liquid separator 600. The vapor-liquid separator 600 separates a vapor refrigerant and a liquid refrigerant and then causes the vapor refrigerant to flow to the compressor 100.

Here, a flow of refrigerant discharged from the vapor-liquid separator 600 passes through the heat exchanger 300 and then is drawn into the compressor 100. Another flow of refrigerant discharged from the vapor-liquid separator 600 is condensed in the condenser 200 while passing through the heat exchanger 300. Thus, heat exchange is performed between the flows of refrigerant passing through the heat exchanger 300.

More specifically, the temperature of the refrigerant condensed in the condenser 200 and introduced to the heat exchanger 300 is higher than the temperature of the refrigerant introduced to the heat exchanger 300 after having been expanded while passing through the expansion valve 400, evaporated in the evaporator 500, and then passed through the vapor-liquid separator 600.

Consequently, the heat is absorbed from the condensed refrigerant introduced from the condenser 200 to the heat exchanger 300 to the refrigerant introduced from the vapor-liquid separator 600 to the heat exchanger. As the refrigerant that has expanded and has absorbed heat is drawn into the compressor 100, the energy efficiency of the compressor 100 may be increased.

In this manner, while the refrigerant circulates sequentially through the compressor 100, the condenser 200, the heat exchanger 300, the expansion valve 400, the evaporator 500, the vapor-liquid separator 600, and the heat exchanger 300, the refrigerant exchanges heat with the cooling water and, at the same time, refrigerant-to-refrigerant heat exchange is performed.

In the meantime, in the related art, the refrigerant circulating through the compressor, the condenser, the expansion valve, and the vapor-liquid separator flows through connecting pipes or connecting hoses through which components are connected. In contrast, embodiments of the present invention can omit or minimize the connecting pipes or the connecting hoses through which the refrigerant flows by improving the arrangement of the compressor 100, the condenser 200, the expansion valve 400, the evaporator 500, and the vapor-liquid separator 600 and additionally disposing the heat exchanger 300. Accordingly, it is possible to modularize refrigerant-related components and lines and enable the refrigerant-to-refrigerant heat exchange, thereby improving the energy efficiency.

Figure 2:
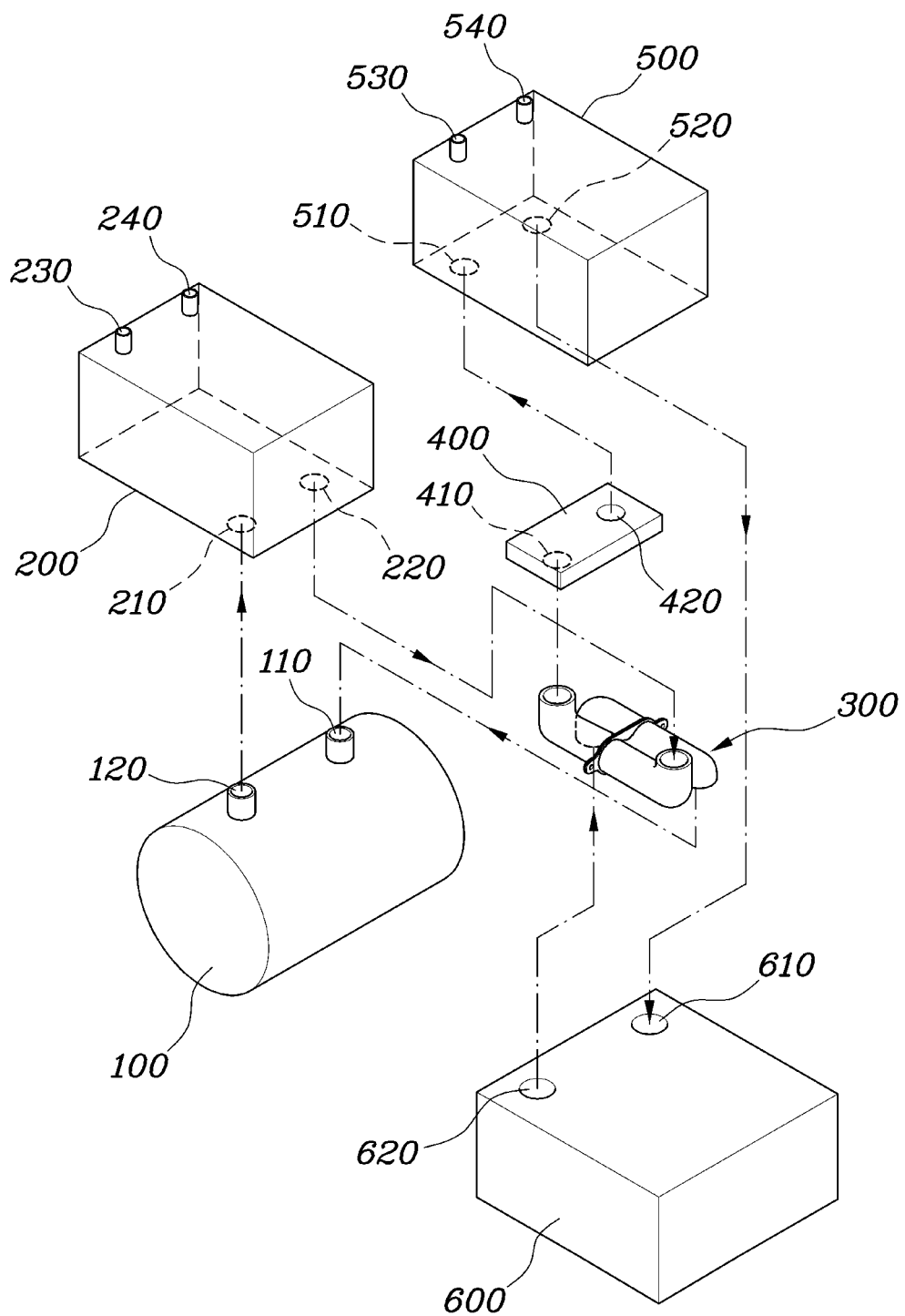
FIG. 2 is an exploded perspective view illustrating the refrigerant module of an integrated thermal management system for a vehicle according to embodiments of the present invention.
Figure 3:
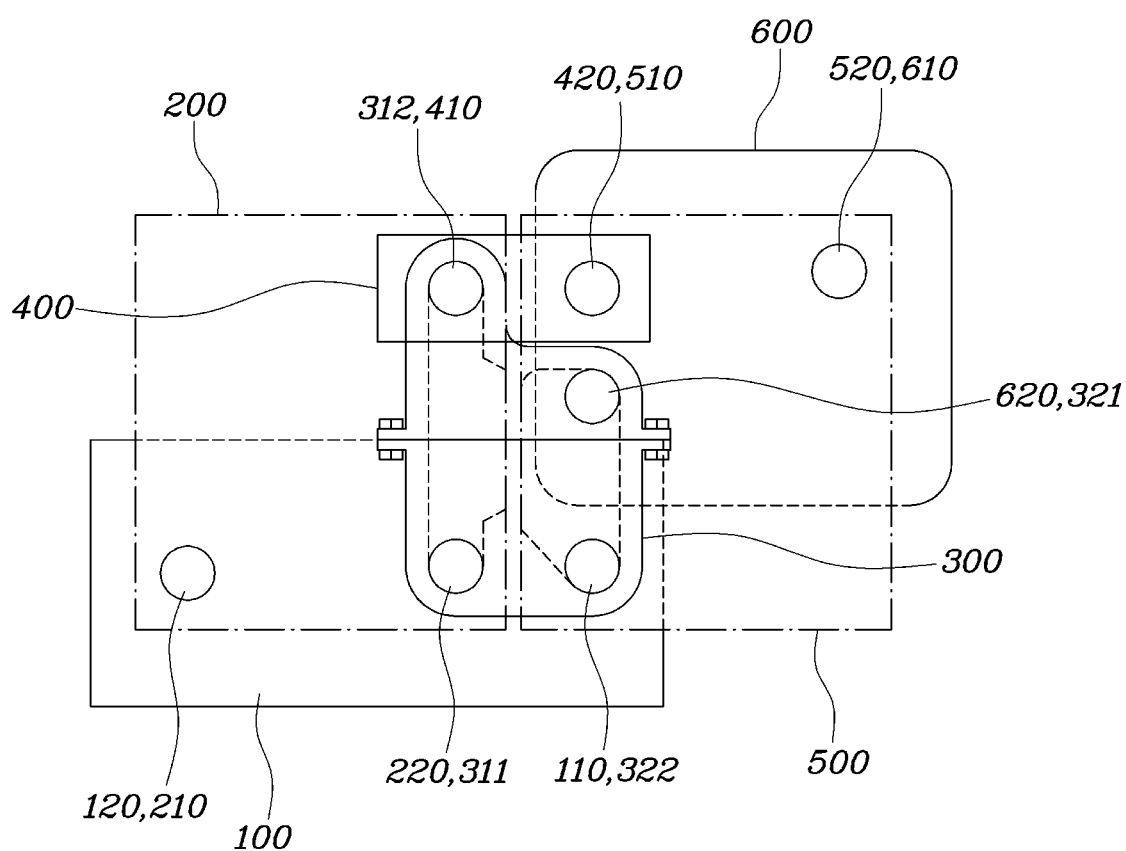
FIG. 3 is a top view illustrating the refrigerant module of an integrated thermal management system for a vehicle according to embodiments of the present invention.
Figure 4:
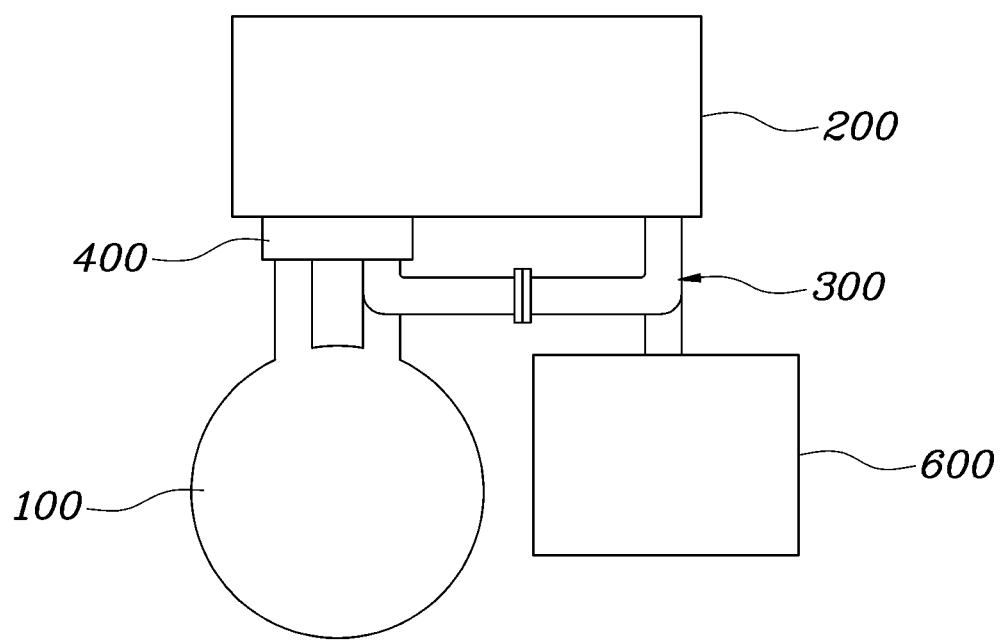
FIG. 4 is a front view illustrating the refrigerant module of an integrated thermal management system for a vehicle according to embodiments of the present invention.

FIG. 2 is an exploded perspective view illustrating the refrigerant module of an integrated thermal management system for a vehicle according to embodiments of the present invention, FIG. 3 is a top view illustrating the refrigerant module of an integrated thermal management system for a vehicle according to embodiments of the present invention, and FIG. 4 is a front view illustrating the refrigerant module of an integrated thermal management system for a vehicle according to embodiments of the present invention.

As described above, the refrigerant module of the integrated thermal management system for a vehicle according to embodiments of the present invention is provided by modularizing the refrigerant-related components and lines. The refrigerant module includes the compressor 100, the condenser 200, the expansion valve 400, the evaporator 500, and the vapor-liquid separator 600. The refrigerant module also includes the heat exchanger 300 through which both the refrigerant flowing between the condenser 200 and the expansion valve 400 and the refrigerant flowing between the vapor-liquid separator 600 and the compressor 100 flow so that the refrigerant-to-refrigerant heat exchange is performed.

Here, the compressor 100, the condenser 200, the expansion valve 400, the evaporator 500, and the vapor-liquid separator 600 may be fabricated in a variety of shapes in which respective components can perform the functions thereof. In particular, each of the compressor 100, the condenser 200, the expansion valve 400, the evaporator 500, and the vapor-liquid separator 600 may have any internal configuration that can perform the function thereof.

However, in the present embodiment, the positions and directions of port openings through which the refrigerant is drawn into and discharged from the compressor 100, the condenser 200, the expansion valve 400, the evaporator 500, and the vapor-liquid separator 600 are limited in order to minimize lines through which the refrigerant flows by improving the relationship of arrangements and the relationship of connections of the compressor 100, the condenser 200, the expansion valve 400, the evaporator 500, and the vapor-liquid separator 600. In addition, the structure of the heat exchanger 300 in which the refrigerant-to-refrigerant heat exchange is performed, as well as the relationship of connections of the heat exchanger 300 to other configurations, are limited.

More specifically, the compressor 100 includes a first refrigerant intake port no through which the refrigerant is drawn from the vapor-liquid separator 600 and a first refrigerant discharge port 120 through which the compressed refrigerant is discharged.

In addition, the condenser 200 includes a second refrigerant intake port 210 through which the refrigerant discharged from the compressor 100 is drawn and a second refrigerant discharge port 220 through which the heat-exchanged refrigerant is discharged. Here, the condenser 200 includes a first cooling water intake port 230 through which the cooling water for exchanging heat with the refrigerant is introduced and a first cooling water discharge port 240 through which the heat-exchanged cooling water is discharged.

In addition, the expansion valve 400 includes a third refrigerant intake port 410 through which the refrigerant discharged from the condenser 200 and having passed through the heat exchanger 300 is drawn and a third refrigerant discharge port 420 through which the expanded refrigerant is discharged.

In addition, the evaporator 500 includes a fourth refrigerant intake port 510 through which the refrigerant discharged from the expansion valve 400 is drawn and a fourth refrigerant discharge port 520 through which the heat-exchanged refrigerant is discharged. Here, the evaporator 500 includes a second cooling water intake port 530 through which the cooling water for exchanging heat with the refrigerant is introduced and a second cooling water discharge port 540 through which the heat-exchanged cooling water is discharged.

In addition, the vapor-liquid separator 600 includes a fifth refrigerant intake port 610 through which the refrigerant discharged from the evaporator 500 is drawn and a fifth refrigerant discharge port 620 through which the vapor refrigerant of the liquid refrigerant and the vapor refrigerant separated from each other are discharged.

In addition, the heat exchanger 300 is disposed between the vapor-liquid separator 600 and the compressor 100. The heat exchanger 300 causes the refrigerant discharged from the vapor-liquid separator 600 to exchange heat with the refrigerant discharged from the condenser 200 and then flow to the compressor 100.

In addition, the heat exchanger 300 includes a first flow path 310 through which the refrigerant discharged from the condenser 200 and drawn into the expansion valve 400 flows and a second flow path 320 through which the refrigerant discharged from the vapor-liquid separator 600 and drawn into the compressor 100 flows such that the refrigerant-to-refrigerant heat exchange is performed. In addition, the first flow path 310 and the second flow path 320 are formed on both sides of a heat exchange region 330. The first flow path 310 directly faces one side of the heat exchange region 330, whereas the second flow path 320 directly faces the other side of the heat exchange region 330. Thus, the refrigerant flowing through the first flow path 310 and the refrigerant flowing through the second flow path 320 exchange heat with each other through the heat exchange region 330.

Next, the relationship of connections of the above-described components will be described.

First, according to the sequence of flowing of the refrigerant, the first refrigerant discharge port 120 of the compressor 100 and the second refrigerant intake port 210 of the condenser 200 are directly connected, whereas the second refrigerant discharge port 220 of the condenser 200 and the third refrigerant intake port 410 of the expansion valve 400 are indirectly connected through the heat exchanger 300. Particularly, the second refrigerant discharge port 220 of the condenser 200 may be directly connected to the first flow path 310 of the heat exchanger 300, and the first flow path 310 of the heat exchanger 300 may be directly connected to the third refrigerant intake port 410 of the expansion valve 400.

In addition, the third refrigerant discharge port 420 of the expansion valve 400 and the fourth refrigerant intake port 510 of the evaporator 500 are directly connected, whereas the fourth refrigerant discharge port 520 of the evaporator 500 and the fifth refrigerant intake port 610 of the vapor-liquid separator 600 are directly connected.

In addition, the fifth refrigerant discharge port 620 of the vapor-liquid separator 600 and the first refrigerant intake port 110 of the compressor 100 are indirectly connected through the heat exchanger 300. Particularly, the fifth refrigerant discharge port 620 of the vapor-liquid separator 600 may be directly connected to the second flow path 320 of the heat exchanger 300, whereas the second flow path 320 of the heat exchanger 300 may be directly connected to the first refrigerant intake port 110 of the compressor 100.

The compressor 100 and the vapor-liquid separator 600 are arranged in parallel in the horizontal direction and the condenser 200 and the evaporator 500 are arranged in parallel in the horizontal direction above the compressor 100 and the vapor-liquid separator 600 for the connection of the above-described components. In addition, particularly, the expansion valve 400 and the heat exchanger 300 may be arranged between the compressor 100 and the vapor-liquid separator 600 arranged in parallel and positioned below and the condenser 200 and the evaporator 500 arranged in parallel and positioned above.

In addition, according to these arrangements, the ports of the compressor 100 and the vapor-liquid separator 600, through which the refrigerant is drawn and discharged, are directed upward.

For example, the first refrigerant intake port no and the first refrigerant discharge port 120 are formed on the top portion of the compressor 100 so as to face upward. In addition, in the same manner, the fifth refrigerant intake port 610 and the fifth refrigerant discharge port 620 are formed on the top portion of the vapor-liquid separator 600 so as to face upward.

In contrast, the ports of the condenser 200 and the evaporator 500, through which the refrigerant is drawn and discharged, are directed downward.

For example, the second refrigerant intake port 21 and the second refrigerant discharge port 220 are formed on the bottom portion of the condenser 200 so as to face downward. In addition, in the same manner, the fourth refrigerant intake port 510 and the fourth refrigerant discharge port 520 are formed on the bottom portion of the evaporator 500 so as to face downward.

In addition, the third refrigerant intake port 410 through which the refrigerant is drawn is formed on the bottom portion of the expansion valve 400 so as to face downward, and the third refrigerant discharge port 420 through which the refrigerant is discharged is formed on the top portion so as to face upward.

In addition, the heat exchanger 300 includes a first inlet 311 through which the refrigerant is introduced to the first flow path 310, a first outlet 312 through which the refrigerant is discharged from the first flow path 310, a second inlet 321 through which the refrigerant is introduced to the second flow path 320, and a second outlet 322 through which the refrigerant is discharged from the second flow path 320, in which the first inlet 311 and the first outlet 312 are open upward, and the second inlet 321 and the second outlet 322 are open downward.

Thus, the condenser 200 is disposed above the compressor 100 such that the second refrigerant intake port 210 of the condenser 200 is disposed directly above the first refrigerant discharge port 120 of the compressor 100. The first refrigerant discharge port 120 and the second refrigerant intake port 210 are directly connected. Thus, the refrigerant may directly flow between the compressor 100 and the condenser 200 without any other connecting component.

In addition, after the evaporator 500 is disposed in parallel to (or in a horizontal direction with respect to) the condenser 200, the vapor-liquid separator 600 is disposed below the condenser 200 such that the fifth refrigerant intake port 610 of the vapor-liquid separator 600 is disposed directly below the fourth refrigerant discharge port 520 of the evaporator 500. The fourth refrigerant discharge port 520 and the fifth refrigerant intake port 610 are directly connected to each other. Thus, the refrigerant may directly flow between the evaporator 500 and the vapor-liquid separator 600 without any other connecting component.

In addition, after the heat exchanger 300 and the expansion valve 400 are disposed below the condenser 200 and the evaporator 500, the first inlet 311 of the first flow path 310 provided in the heat exchanger 300 is disposed directly below the second refrigerant discharge port 220 provided in the condenser 200, and the third refrigerant intake port 410 of the expansion valve 400 is disposed directly above the first outlet 312 of the first flow path 310 provided in the heat exchanger 300.

Thus, the second refrigerant discharge port 220 of the condenser 200 and the third refrigerant intake port 410 of the expansion valve 400 are indirectly connected through the first flow path of the heat exchanger 300 such that the refrigerant discharged from the condenser 200 passes through the first flow path 310 of the heat exchanger 300 before being drawn into the expansion valve 400.

In addition, the fourth refrigerant intake port 510 provided in the evaporator 500 is disposed directly above the third refrigerant discharge port 420 provided in the expansion valve 400. Thus, the third refrigerant discharge port 420 and the fourth refrigerant intake port 510 are directly connected such that the refrigerant may also directly flow between the expansion valve 400 and the evaporator 500 without any other connecting component.

In addition, after the vapor-liquid separator 600 is disposed below the evaporator 500, the fifth refrigerant intake port 610 of the vapor-liquid separator 600 is disposed directly below the fourth refrigerant discharge port 520 provided in the evaporator 500. Thus, the fourth refrigerant discharge port 520 and the fifth refrigerant intake port 610 are directly connected such that the refrigerant may also directly flow between the evaporator 500 and the vapor-liquid separator 600 without any other connecting component.

Here, it is necessary for the fifth refrigerant discharge port 620 of the vapor-liquid separator 600 and the first refrigerant intake port no of the compressor 100 to be connected in order to draw the refrigerant discharged from the vapor-liquid separator 600 into the compressor 100. However, both the first refrigerant intake port no of the compressor 100 and the fifth refrigerant discharge port 620 of the vapor-liquid separator 600 are directly upward, and the compressor 100 and the vapor-liquid separator 600 are arranged in parallel in the horizontal direction. Thus, the first refrigerant intake port no and the fifth refrigerant discharge port 620 are indirectly connected by disposing the heat exchanger 300 therebetween.

In this regard, the second inlet 321 of the second flow path 320 provided in the heat exchanger 300 is disposed directly above the fifth refrigerant discharge port 620 provided in the vapor-liquid separator 600, and the first refrigerant intake port no of the compressor 100 is disposed directly below the second outlet 322 of the second flow path 320 provided in the heat exchanger 300.

Thus, the fifth refrigerant discharge port 620 of the vapor-liquid separator 600 and the first refrigerant intake port no of the compressor 100 are indirectly connected through the second flow path 320 of the heat exchanger 300 such that the refrigerant discharged from the vapor-liquid separator 600 passes through the second flow path 320 of the heat exchanger 300 before being drawn into the compressor 100.

In addition, the refrigerant flowing through the second flow path 320 of the heat exchanger 300 exchanges heat with the refrigerant flowing through the first flow path 310 of the heat exchanger 300.

In this regard, particularly, the heat exchanger 300 may be configured such that the heat exchange is performed between the flows of refrigerant without obstruction to the flows of refrigerant flowing through the first flow path 310 and the second flow path 320.

Figure 5:
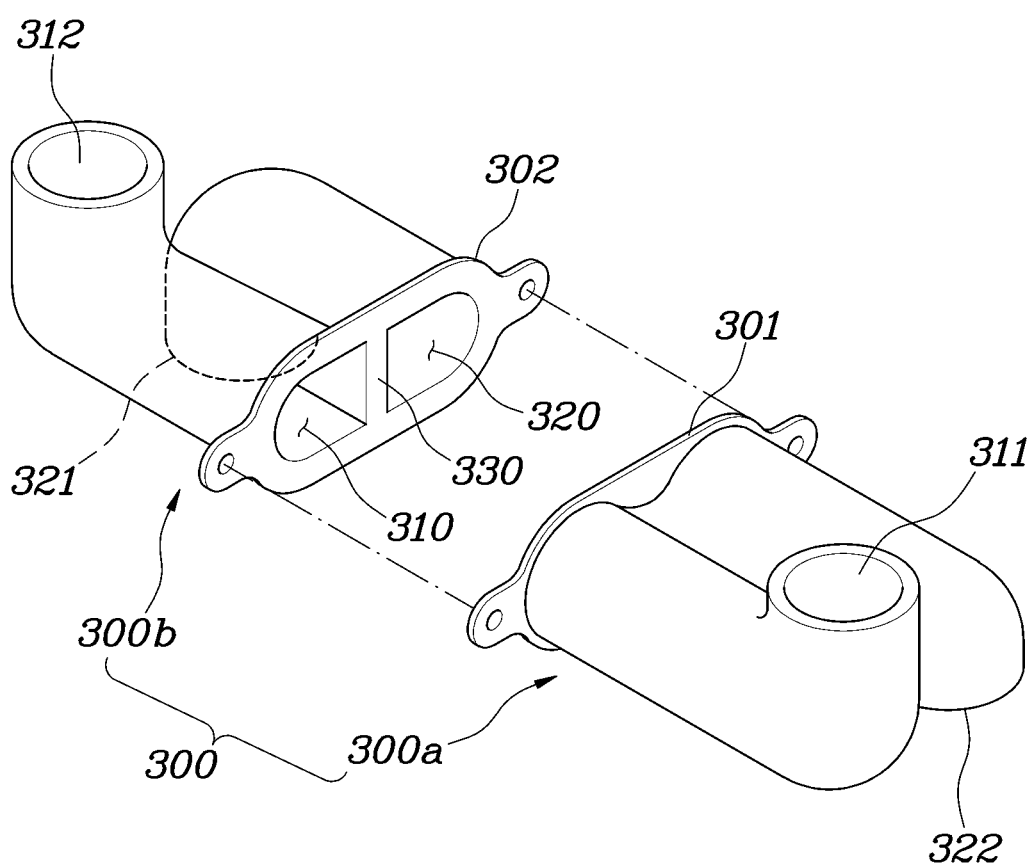
FIG. 5 is an exploded perspective view illustrating a heat exchanger of the refrigerant module according to embodiments of the present invention.
Figure 6:
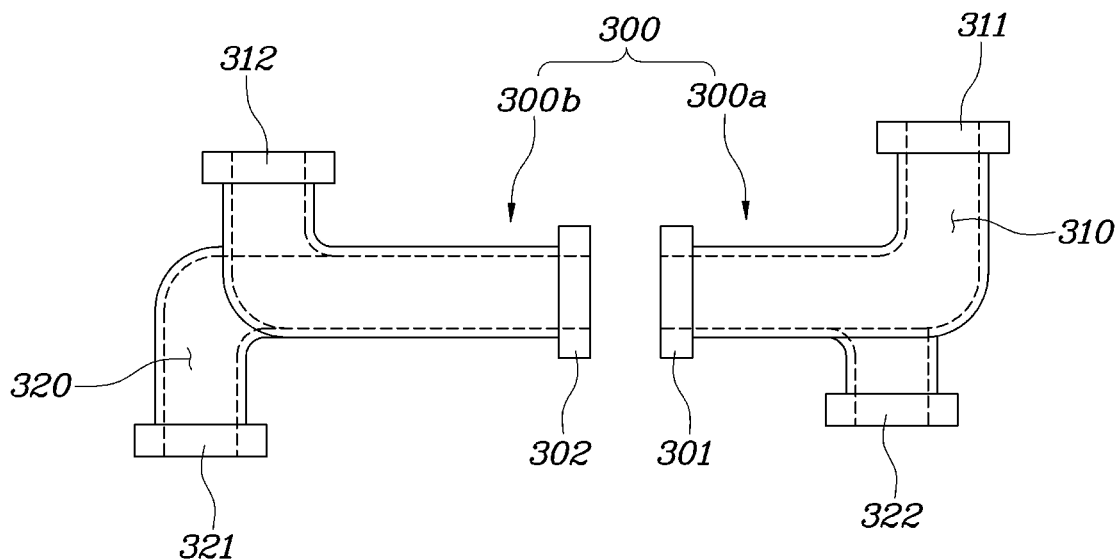
FIG. 6 is a front view illustrating the heat exchanger of the refrigerant module according to embodiments of the present invention.
Figure 7:
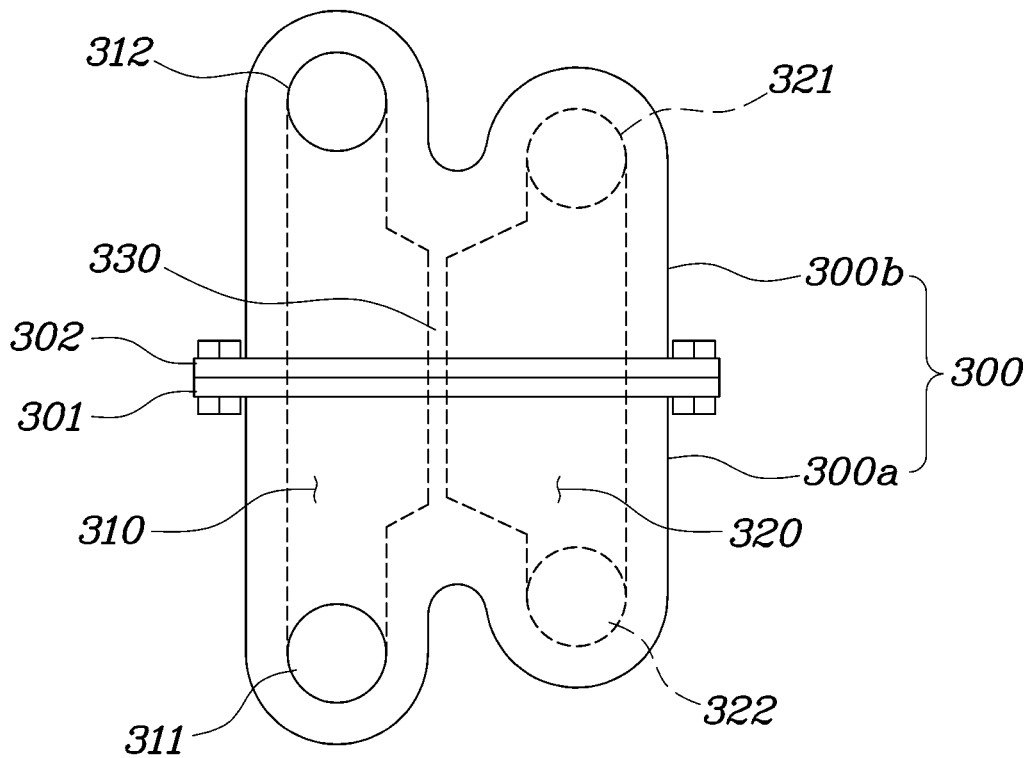
FIG. 7 is a plan view illustrating the heat exchanger of the refrigerant module according to embodiments of the present invention.
Figure 8:
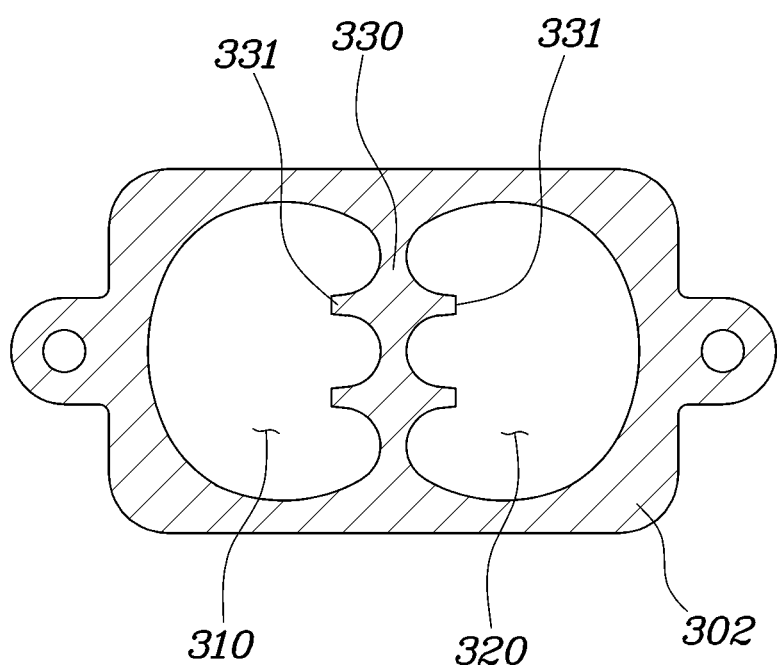
FIG. 8 is a cross-sectional view illustrating the coupling region of either the first body or the second body of the heat exchanger of the refrigerant module according to embodiments of the present invention.

FIG. 5 is an exploded perspective view illustrating a heat exchanger of the refrigerant module according to embodiments of the present invention, FIG. 6 is a front view illustrating the heat exchanger of the refrigerant module according to embodiments of the present invention, FIG. 7 is a plan view illustrating the heat exchanger of the refrigerant module according to embodiments of the present invention, and FIG. 8 is a cross-sectional view illustrating the coupling region of either the first body or the second body of the heat exchanger of the refrigerant module according to embodiments of the present invention.

As described above and illustrated in FIGS. 5 to 8, in the heat exchanger 300, the first flow path 310 through which the refrigerant discharged from the condenser 200 and drawn into the expansion valve 400 is formed and the second flow path 320 through which the refrigerant discharged from the vapor-liquid separator 600 and drawn into the compressor 100 is formed such that the refrigerant-to-refrigerant heat exchange is performed. In particular, the first flow path 310 and the second flow path 320 are formed on both sides of the heat exchange region 330.

In addition, in the heat exchanger 300, the first inlet 311 through which the refrigerant is introduced to the first flow path 310 and the first outlet 312 through which the refrigerant is discharged from the first flow path 310 are open upward, and the second inlet 321 through which the refrigerant is introduced to the second flow path 320 and the second outlet 322 through which the refrigerant is discharged from the second flow path 320 are open downward.

In this manner, in the heat exchanger 300, the first flow path 310 and the second flow path 320 are formed in parallel on both sides of the heat exchange region 330. The first inlet 311 and the first outlet 312 formed in the first flow path 310 need to be open upward, whereas the second inlet 321 and the second outlet 322 formed in the second flow path 320 need to be open downward.

Thus, in order to facilitate the fabrication of the heat exchanger 300, in the present embodiment, the heat exchanger 300 is fabricated by separately preparing a first body 300a and a second body 300b in which each of the first flow path 310 and the second flow path 320 is halved in the directions of the flows of refrigerant and then coupling the first body 300a and the second body 300b.

More specifically, the first body 300a is configured such that substantially a half of each of the first flow path 310, the second flow path 320, and the heat exchange region 330 is formed. Thus, the first inlet 311 and the second outlet 322 are formed on one side of the first body 300a. In addition, a first flange 301 connected to the second body 300b is formed on the other side of the first body 300a.

In addition, the second body 300b is configured such that substantially a half of each of the first flow path 310, the second flow path 320, and the heat exchange region 330 is formed. Thus, a second flange 302 coupled to the first flange 301 of the first body 300a is formed on one side of the second body 300b. In addition, the second inlet 321 and the first outlet 312 are formed on the other side of the second body 300b.

In addition, in the heat exchange region 330 formed on the heat exchanger 300, particularly, one or more fins 331 may protrude in the direction of each of the first flow path 310 and the second flow path 320 in order to increase the areas facing the first flow path 310 and the second flow path 320, thereby improving heat exchange efficiency.

Here, particularly, the protruding fins 331 may extend in the flowing directions of the refrigerant in order to have predetermined areas in the flowing directions of the refrigerant so that the flows of refrigerant are not obstructed.

In particular, particularly, the protruding fins 331 may be spaced apart from each other by a predetermined distance in the top-bottom direction on both surfaces of the heat exchange region 330 so that the refrigerant may properly flow through the space between the protruding fins 331.

Although the exemplary embodiments of the present invention have been described for illustrative purposes, a person having ordinary skill in the art will appreciate that various modifications, additions, and substitutions are possible, without departing from the scope and spirit of the present invention as disclosed in the accompanying claims.

What is claimed is:
1. A heat exchanger comprising:
a first flow path through which a refrigerant discharged from a condenser and drawn into an expansion valve flows;

a second flow path through which the refrigerant discharged from a vapor-liquid separator and drawn into a compressor flows, wherein the heat exchanger is configured to perform a heat exchange between the refrigerant flowing through the first flow path and the refrigerant flowing through the second flow path;

a first inlet through which the refrigerant is introduced to the first flow path, the first inlet being open upward;

a first outlet through which the refrigerant is discharged from the first flow path, the first outlet being open upward;

a second inlet through which the refrigerant is introduced to the second flow path, the second inlet being open downward;

a second outlet through which the refrigerant is discharged from the second flow path, the second outlet being open downward; and a first body and a second body in which each of the first flow path and the second flow path is halved in flowing directions of the refrigerant;

wherein the first inlet and the second outlet are formed in a first side of the first body;

wherein a first flange connected to the second body is formed on a second side of the first body;

wherein a second flange coupled to the first flange of the first body is formed on a first side of the second body; and wherein the second inlet and the first outlet are formed in a second side of the second body.

2. The heat exchanger of claim 1, further comprising a heat exchange region provided between the first flow path and the second flow path to directly face the first flow path and the second flow path, wherein the heat exchanger is configured to perform the heat exchange between the refrigerant flowing through the first flow path and the refrigerant flowing through the second flow path in the heat exchange region.

3. The heat exchanger of claim 2, wherein the heat exchange region comprises one or more protruding fins protruding in a direction of the first flow path or a direction of the second flow path.

4. The heat exchanger of claim 3, wherein each of the protruding fins has a cross-section constant in a direction in which the refrigerant flows.

5. The heat exchanger of claim 4, wherein the protruding fins on either side of the heat exchange region are spaced apart from each other in a top-bottom direction.

6. A refrigerant module for an integrated thermal management system for a vehicle, the refrigerant module comprising:

a compressor comprising a first refrigerant intake port through which a refrigerant is drawn and a first refrigerant discharge port through which the refrigerant is discharged after being compressed;

a condenser comprising a second refrigerant intake port through which the refrigerant discharged from the compressor is drawn and a second refrigerant discharge port through which the refrigerant is discharged after being heat-exchanged;

an expansion valve comprising a third refrigerant intake port through which the refrigerant discharged from the condenser is drawn and a third refrigerant discharge port through which the refrigerant is discharged after being expanded;

an evaporator comprising a fourth refrigerant intake port through which the refrigerant discharged from the expansion valve and a fourth refrigerant discharge port through which the refrigerant is discharged after being heat-exchanged;

a vapor-liquid separator comprising a fifth refrigerant intake port through which the refrigerant discharged from the evaporator is drawn and a fifth refrigerant discharge port through which a liquid refrigerant and a vapor refrigerant separated from the refrigerant are discharged;

a heat exchanger configured to perform a heat exchange between the refrigerant discharged from the condenser and drawn into the expansion valve and the refrigerant discharged from the vapor-liquid separator and drawn into the compressor, wherein the heat exchanger comprises a first flow path through which the refrigerant discharged from the condenser and drawn into the expansion valve flows and a second flow path through which the refrigerant discharged from the vapor-liquid separator and drawn into the compressor flows, and wherein the heat exchanger is configured to perform the heat exchange between the refrigerant flowing through the first flow path and the refrigerant flowing through the second flow path;

a first inlet through which the refrigerant is introduced to the first flow path, the first inlet being open upward;

a first outlet through which the refrigerant is discharged from the first flow path, the first outlet being open upward;

a second inlet through which the refrigerant is introduced to the second flow path, the second inlet being open downward;

a second outlet through which the refrigerant is discharged from the second flow path, the second outlet being open downward; and a first body and a second body in which each of the first flow path and the second flow path is halved in flowing directions of the refrigerant;

wherein the first inlet and the second outlet are formed in a first side of the first body;

wherein a first flange connected to the second body is formed on a second side of the first body;

wherein a second flange coupled to the first flange of the first body is formed on a first side of the second body; and wherein the second inlet and the first outlet are formed in a second side of the second body.

7. The refrigerant module of claim 6, wherein:

the first refrigerant discharge port of the compressor and the second refrigerant intake port of the condenser are directly connected;

the second refrigerant discharge port of the condenser and the third refrigerant intake port of the expansion valve are indirectly connected through the heat exchanger;

the third refrigerant discharge port of the expansion valve and the fourth refrigerant intake port of the evaporator are directly connected;

the fourth refrigerant discharge port of the evaporator and the fifth refrigerant intake port of the vapor-liquid separator are directly connected; and the fifth refrigerant discharge port of the vapor-liquid separator and the first refrigerant intake port of the compressor are indirectly connected through the heat exchanger.

8. The refrigerant module of claim 7, wherein the the first flow path and the second flow path are formed on both sides of a heat exchange region such that the heat exchanger is configured to perform the heat exchange between the refrigerant flowing through the first flow path and the refrigerant flowing through the second flow path in the heat exchange region.

9. The refrigerant module of claim 8, wherein:
the second refrigerant discharge port is formed downward in a bottom end of the condenser;
the third refrigerant intake port is formed downward in a bottom end of the expansion valve;
the first inlet of the heat exchanger is disposed directly below the second refrigerant discharge port provided in the condenser such that the second refrigerant discharge port and the first inlet are directly connected to and communicate with each other; and
the third refrigerant intake port of the expansion valve is disposed directly above the first outlet provided in the heat exchanger such that the first outlet and the third refrigerant intake port are directly connected to and communicate with each other.

10. The refrigerant module of claim 8, wherein:
the fifth refrigerant discharge port is formed upward in a top portion of the vapor-liquid separator;
the first refrigerant intake port is formed upward in a top portion of the compressor;
the second inlet of the heat exchanger is disposed directly above the fifth refrigerant discharge port provided in the vapor-liquid separator such that the fifth refrigerant discharge port and the second inlet are directly connected to and communicate with each other; and
the first refrigerant intake port of the compressor is disposed directly below the second outlet provided in the heat exchanger such that the second outlet and the first refrigerant intake port are directly connected to and communicate with each other.

11. The refrigerant module of claim 8, wherein the first flow path and the second flow path formed in the heat exchanger are in direct contact with the heat exchange region.

12. The refrigerant module of claim 11, wherein the heat exchange region of the heat exchanger comprises one or more protruding fins protruding in a direction of the first flow path or a direction of the second flow path.

13. The refrigerant module of claim 12, wherein each of the protruding fins has a cross-section that is constant in a direction in which the refrigerant flows.

14. The refrigerant module of claim 7, wherein:
the first refrigerant discharge port is formed upward in a top portion of the compressor;
the second refrigerant intake port is formed downward in a bottom portion of the condenser; and
the second refrigerant intake port of the condenser is disposed directly above the first refrigerant discharge port provided in the compressor such that the first refrigerant discharge port and the second refrigerant intake port are directly connected to and communicate with each other.

15. The refrigerant module of claim 7, wherein:
the third refrigerant discharge port is formed upward in a top portion of the expansion valve;
the fourth refrigerant intake port is formed downward in a bottom portion of the evaporator; and
the fourth refrigerant intake port of the evaporator is disposed directly above the third refrigerant discharge port provided in the expansion valve such that the third refrigerant discharge port and the fourth refrigerant intake port are directly connected to and communicate with each other.

16. The refrigerant module of claim 7, wherein:
the fourth refrigerant discharge port is formed downward in a bottom portion of the evaporator;
the fifth refrigerant intake port is formed upward in a top portion of the vapor-liquid separator; and
the fifth refrigerant intake port of the vapor-liquid separator is disposed directly below the fourth refrigerant discharge port provided in the evaporator such that the fourth refrigerant discharge port and the fifth refrigerant intake port are directly connected to and communicate with each other.

17. The refrigerant module of claim 7, wherein:
the compressor and the vapor-liquid separator are arranged in parallel in a horizontal direction; and
the condenser and the evaporator are provided above the compressor and the vapor-liquid separator and arranged in parallel in the horizontal direction.

18. The refrigerant module of claim 6, wherein:
the condenser comprises a first cooling water intake port through which cooling water for exchanging heat with the refrigerant drawn through the second refrigerant intake port and discharged through the second refrigerant discharge port is introduced and a first cooling water discharge port through which the cooling water is discharged; and
the evaporator comprises a second cooling water intake port through which cooling water for exchanging heat with the refrigerant drawn through the fourth refrigerant intake port and discharged through the fourth refrigerant discharge port is introduced and a second cooling water discharge port through which the cooling water is discharged.

* * * * *